(12) United States Patent
Scozzaro

(10) Patent No.: US 9,775,053 B2
(45) Date of Patent: Sep. 26, 2017

(54) METHOD FOR LOCALIZING THE POSITION OF A WIRELESS DEVICE IN AN ENVIRONMENT COMPRISING A WIRELESS NETWORK HAVING AT LEAST ONE ACCESS POINT

(75) Inventor: Andrea Scozzaro, Turin (IT)

(73) Assignee: Sisvel Technology S.R.L., None (TO) (IT)

(*) Notice: Subject to any disclaimer, the term of this patent is extended or adjusted under 35 U.S.C. 154(b) by 0 days.

(21) Appl. No.: 13/981,301

(22) PCT Filed: Feb. 22, 2012

(86) PCT No.: PCT/IB2012/050804
§ 371 (c)(1),
(2), (4) Date: Jul. 23, 2013

(87) PCT Pub. No.: WO2012/114283
PCT Pub. Date: Aug. 30, 2012

(65) Prior Publication Data
US 2013/0310073 A1    Nov. 21, 2013

(30) Foreign Application Priority Data

Feb. 25, 2011 (IT) ............................ TO2011A0167
Sep. 20, 2011 (IT) ............................ TO2011A0839

(51) Int. Cl.
*H04W 24/00* (2009.01)
*G01S 5/00* (2006.01)
(Continued)

(52) U.S. Cl.
CPC ........... *H04W 24/00* (2013.01); *G01S 5/0063* (2013.01); *G01S 5/0226* (2013.01); *G01S 5/08* (2013.01);
(Continued)

(58) Field of Classification Search
CPC ...................................................... H04W 64/00
(Continued)

(56) References Cited

U.S. PATENT DOCUMENTS 7,323,991 B1 * 1/2008 Eckert ................ G07C 9/00111
235/382
7,876,724 B2 * 1/2011 Hi Sim ................ H04W 48/08
370/328
(Continued)

FOREIGN PATENT DOCUMENTS

CN    101144722 A    3/2008
JP    04-320178 A    11/1992
(Continued)

OTHER PUBLICATIONS

Chandra et al., "Beacon-Stuffing: Wi-Fi Without Assocations", 2007, Eighth IEEE Workshop on Mobile Computing Systems and Applications.*
(Continued)

*Primary Examiner* — Kathy Wang-Hurst
*Assistant Examiner* — Said Elnoubi
(74) *Attorney, Agent, or Firm* — Workman Nydegger

(57) ABSTRACT

A method for localizing the position of a wireless device (7) in an environment (2) includes a wireless network (1) having at least one access point (3), wherein the method includes the step of receiving, by the wireless device (7), a radio frequency signal (10) which is transmitted by the at least one access point (3) and which comprises basic information for connecting to the at least one access point (3), wherein the radio frequency signal (10) includes geographic information (20) about the geographic position of at least one electronic radio frequency device (5) located in the environment (2) and not connected to the wireless network (1).

13 Claims, 2 Drawing Sheets

(51) Int. Cl.
  *G01S 5/02* (2010.01)
  *G01S 5/08* (2006.01)
  *H04L 29/08* (2006.01)
  *H04W 4/20* (2009.01)
  *H04W 64/00* (2009.01)

(52) U.S. Cl.
  CPC ............. *H04L 67/18* (2013.01); *H04W 4/20* (2013.01); *H04W 64/00* (2013.01)

(58) Field of Classification Search
  USPC .......................................... 455/456.1, 456.6
  See application file for complete search history.

(56) References Cited

U.S. PATENT DOCUMENTS

| | | | | |
|---|---|---|---|---|
| 2004/0147269 | A1* | 7/2004 | Kim | G01S 5/0054 455/456.2 |
| 2005/0140507 | A1 | 6/2005 | Nam et al. | |
| 2007/0184845 | A1* | 8/2007 | Troncoso | H04W 64/00 455/456.1 |
| 2008/0082258 | A1 | 4/2008 | Pham et al. | |
| 2009/0204677 | A1* | 8/2009 | Michaelis | G06F 17/30867 709/206 |
| 2009/0286510 | A1* | 11/2009 | Huber | G06Q 20/1235 455/410 |
| 2010/0205316 | A1* | 8/2010 | Xue | H04L 63/062 709/229 |
| 2011/0171929 | A1 | 7/2011 | Tamura et al. | |

FOREIGN PATENT DOCUMENTS

| | | | |
|---|---|---|---|
| JP | 2003-111101 A | 4/2003 | |
| JP | 2005189225 | 7/2005 | |
| JP | 2007240206 | 9/2007 | |
| JP | 2008111828 | 5/2008 | |
| JP | 2008219358 | 9/2008 | |
| WO | 2006/096431 A2 | 9/2006 | |
| WO | WO2006/096431 * | 9/2006 | |
| WO | WO 2006096431 A3 * | 5/2007 | ......... G07C 9/00111 |
| WO | 2010/004081 A1 | 1/2010 | |
| WO | WO2010032447 | 3/2010 | |

OTHER PUBLICATIONS

3GPP TS 25.331 (V6.9.0 published Mar. 2006).*
R Chandra et a., Beacon-Stuffing:WiFi Without Associations, 2007, IEEE Eighth Workshop on Mobile Computing and Applications.*
3GPP TS 25.331 V6.9.0 (Mar. 2007).*
International Preliminary Report and Written Opinion dated Aug. 27, 2013, issued in PCT Application No. PCT/IB2012/050804 filed Feb. 22, 2012.
International Search Report dated May 15, 2012, issued in PCT Application No. PCT/IB2012/050804 filed Feb. 22, 2012.

* cited by examiner

METHOD FOR LOCALIZING THE POSITION OF A WIRELESS DEVICE IN AN ENVIRONMENT COMPRISING A WIRELESS NETWORK HAVING AT LEAST ONE ACCESS POINT

BACKGROUND OF THE INVENTION

1. Field of the Invention

The present invention relates to a method for localizing the position of a wireless device in an environment comprising a wireless network having at least one access point.

More in particular, the present invention relates to a method for localizing the position of a wireless device in an environment comprising a wireless network having at least one access point, wherein satellite positioning signals, in particular GPS positioning signals, are not available or provide poor coverage.

2. Present State of the Art

Methods and systems are known in the art for localizing the position of a device, whether fixed or mobile, on the basis of information obtainable through a radio frequency reader built in the device itself and a plurality of radio frequency identifiers, or RFID tags, arranged in a fixed and known manner within an environment.

The position of the device can be determined with variable accuracy on the basis of a triangulation of signals coming from the radio frequency identifiers, identified by a univocal serial number, whose exact position must be known a priori.

The position of such radio frequency identifiers must therefore be obtained beforehand by the device through access to a database by means of any type of connection, e.g. by polling an HTTP service.

As an alternative, the data about the identifiers' position may be preloaded into the device through a wired connection or a memory card.

However, such prior art systems suffer from a few drawbacks.

In the first place, polling a database necessarily requires a connection to the network, whether a local or wide area one, which allows access thereto, with resulting problems of network authentication of the device to be localized.

It is also necessary to know or find the URL address at which the information about the position of the radio frequency identifiers is available.

In addition, the traffic generated by the device to be localized competes with the normal traffic exchanged by other systems, e.g. other Wi-Fi devices such as laptops and smartphones.

In the second place, in the case of memory-preloaded data, although the above problems cannot arise, there are drawbacks related to information updating and to the fact that the device must be located in a well-known and not unforeseen environment.

In fact, it must be taken into account that the devices to be localized are often also conceived for emergency situations (for example, a fireman going into a smoke-saturated environment), and it is unthinkable that the data required for localizing the environment where the emergency situation is occurring have been previously stored in the rescuer's personal localization device or can be stored therein when the rescuer enters the environment.

International patent application No. WO 2010/004081 relates to a method and a system for localizing a device inside a large building, in which GPS positioning signals cannot be received. The method provides for detecting a signal, or "beacon", periodically transmitted in clear by at least one access point receivable by the device, and retrieving position information, contained in said beacon, about the access point. The beacon structure is defined in the IEEE 802.11 standard and later modifications thereof. Alternatively, the MAC ("Media Access Control") address of the access point can be read in the beacon, which MAC address is then used for reading the geographic position of the associated access point in a database.

However, the system described in the above mentioned international patent application suffers from the drawback that the accuracy of the system essentially depends on the number of beacons receivable by the device. In fact, in order to obtain a highly accurate position of the device, it is necessary to make a signal triangulation or geometrical calculations. For better accuracy, the number of the wireless network access points should be increased: this would require high hardware costs and would constitute a waste of resources. The database access alternative is disadvantageous because it requires a data connection that might not be available or unfeasible in emergency conditions.

A further drawback of the method described in the above mentioned international patent application is that it is not possible to change in a simple and economical way the position of the geographic reference points within the environment, unless access points are uninstalled and reinstalled or additional access points are added to the wireless network.

SUMMARY OF THE INVENTION

It is therefore one object of the present invention to provide a method for localizing the position of a wireless device in an environment comprising a wireless network having at least one access point, which allows localizing the wireless device with high accuracy.

It is another object of the present invention to provide a method for localizing the position of a wireless device in an environment comprising a wireless network having at least one access point, which allows localizing the wireless device at low cost.

It is a further object of the present invention to provide a method for localizing the position of a wireless device in an environment comprising a wireless network having at least one access point which allows organizing in a simple and quick manner a network of localization points which can be used by said wireless device for finding its own position.

These and other objects of the invention are achieved through a method for localizing the position of a wireless device in an environment comprising a wireless network having at least one access point as claimed in the appended claims, which are an integral part of the present description.

The invention also relates to a wireless device implementing a method according to the present invention, an access point of a wireless network, a radio frequency signal transmitted by an access point, and a system for localizing a wireless device.

In short, the method according to the invention provides for arranging in an environment covered by a wireless network a plurality of elements not connected to said wireless network, more in particular a plurality of radio frequency identifiers, or RFID tags.

Geographic information about each one of said identifiers not connected to said wireless network is entered into the beacon or into any broadcast channel which is periodically transmitted by an access point of the wireless network in order to allow connection to the same.

Said geographic information may, for example, be entered into the data field "Vendor Specific Information" (VSI) provided for by the IEEE 802.11 standard. The geographic information comprises information which can be used by the wireless device to find its own absolute position within the environment, such as, for example, element identifier, latitude, longitude, altitude, building name or number, floor, room, and the like.

The wireless device can thus localize its own position within the environment without having to authenticate to the network, and can use a plurality of geographic information allowing it to localize its own position with extreme precision.

Further features of the invention are set out in the appended claims, which are intended as an integral part of the present description.

BRIEF DESCRIPTION OF THE DRAWINGS

The above objects will become more apparent from the following detailed description of the method for localizing the position of a wireless device in an environment comprising a wireless network having at least one access point with particular reference to the annexed drawings, wherein.

DETAILED DESCRIPTION OF THE PREFERRED EMBODIMENTS

Figure 1:
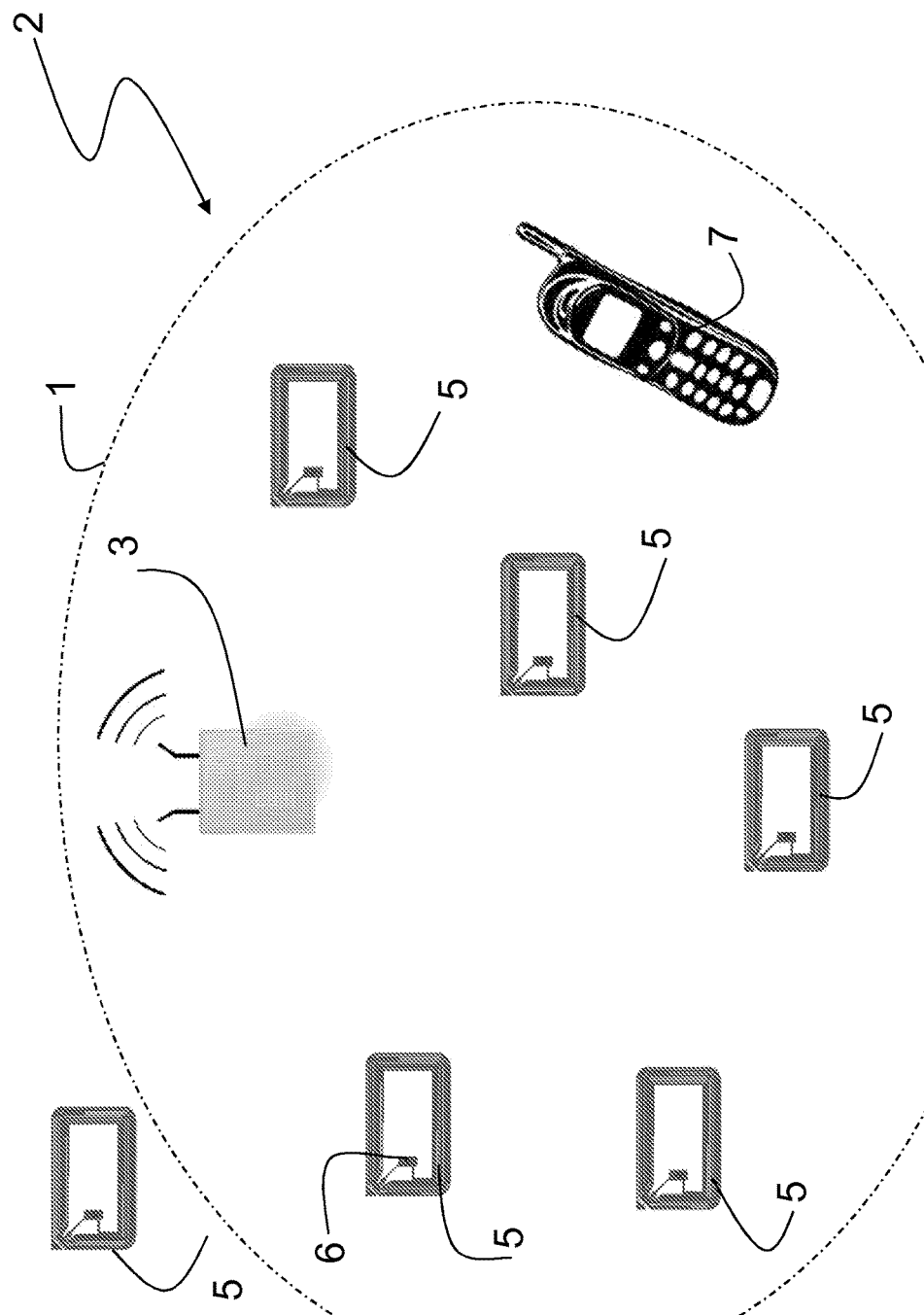
FIG. 1 is a diagram of an environment comprising a wireless network having at least one access point.
Figure 2:
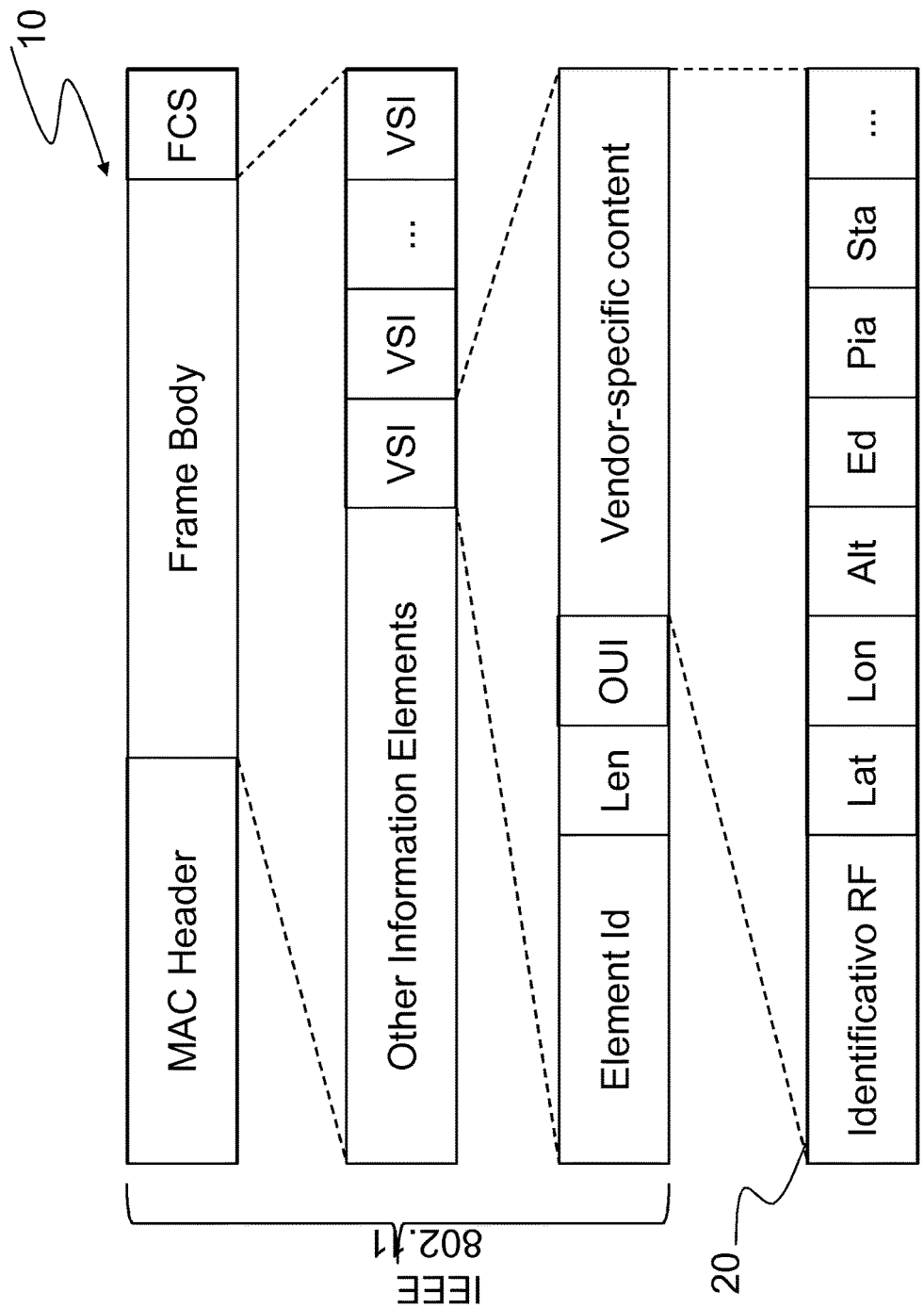
FIG. 2 is a diagram of a beacon of a wireless network used in accordance with the method of the present invention.

With reference to FIGS. 1 and 2, there is shown a diagram of an environment 2 which comprises: a wireless network 1 having at least one access point 3; at least one radio frequency device 5 not connected to said wireless network 1; and a wireless device 7.

The wireless device 7 comprises at least means for receiving data in said wireless network 1, and may consist of, for example, a mobile telephone, a smartphone, a personal digital assistant (PDA), a combination of a mobile telephone and a PDA, a computer, a laptop and the like.

The access point 3 is a device that allows access to the wireless network 1 and that periodically transmits in clear a radio frequency signal, or beacon 10, which comprises basic information necessary for allowing a wireless device 7 to connect thereto and hence to the wireless network 1.

For example, according to the IEEE 802.11 standard, the beacon 10 is transmitted at regular intervals, e.g. every 100 ms, and comprises some mandatory information and other optional information.

To receive the beacon 10, it is not therefore necessary for the wireless device 7 to authenticate to the wireless network 1.

The radio frequency device 5 is not connected to the wireless network 1 and is provided as a radio frequency element with no dependency from the wireless network 1. The radio frequency device 5 may be a device using a different frequency than that of the wireless network 1, and may, for example, be an RFID transponder, whether of the active or passive type, comprising memory means 6 into which a univocal identifier of the radio frequency device 5 has been stored beforehand.

Geographic information 20 transmitted by the access point 3 comprises information which can be used by the wireless device 7 to find its own geographic position within the environment 2, based on the geographic position where the radio frequency 5 not connected to the wireless network 1 is located; said geographic information 20 comprises, for example, the identifier of the radio frequency device 5; latitude, longitude, altitude, building name or number, floor, room, and the like, of the geographic position where the radio frequency device 5 not connected to the wireless network 1 is located.

The method according to the present invention provides for entering into a beacon 10 transmitted by the at least one access point 3 the geographic information 20 of the at least one electronic radio frequency device 5 not connected to the wireless network 1 and located in an environment 2 covered by the wireless network 1. Said geographic information 20 is entered into the beacon, for example, by means of suitable software. For example, and with particular reference to FIG. 2, according to the IEEE 802.11 standard and later modifications said geographic information can be entered into a data field called "Vendor Specific Information" (VSI) of the beacon.

The VSI data field may contain up to a maximum of 252 bytes of information. For each radio frequency device 5 not connected to the wireless network 1, the associated geographic information may require, for example, 21 to 28 bytes. The geographic information 20 pertaining to 9-12 radio frequency devices 5 can therefore be transmitted in the same beacon 10.

The VSI data field is identified by the "Element ID 221" and consists of the following fields: "Element ID" (1 byte), "Length" (1 byte), "OUI" or "Organization Unique Identifier" (3 bytes), "VSI Content" (max. 252 bytes).

The OUI data field identifies the manufacturer or possibly the type of service provided by the information element it refers to.

In order to transmit more geographic information, one can add further VSI data fields into the same beacon 10, or subdivide the geographic information into two or more beacons 10. Since typically the time interval between one beacon 10 and the next beacon 10 is of the order of 100 ms, it is possible to transmit geographic information pertaining to 90-120 radio frequency devices 5 every second.

For example, the "VSI Content" of the VSI data field may contain the following data relating to the geographic information of an electronic radio frequency device 5 not connected to the wireless network 1:

identifier of the radio frequency device 5 (8-12 bytes);
latitude (4 bytes);
longitude (4 bytes);
altitude (2-4 bytes);
building identifier (1 byte);
floor number (1 byte);
room number (1-2 bytes);

Advantageously, the wireless device 7 needs not transmit any data nor decode any encrypted packets. The beacons 10 that must be analyzed by the wireless device 7 are only those that contain the information element contained in the VSI data field, identified by one or more predetermined OUI data fields.

It is conceivable to use two or more different OUI data fields to indicate to the wireless device 7 that the next beacons 10 contain information about other radio frequency devices 5 not connected to the wireless network 1, or that the information is complete.

The wireless device 7 may listen to the beacon either continuously or at regular and variable intervals to save energy.

The wireless device 7, which is located within the environment 2 and receives radio signals from one or more radio frequency devices 5, can estimate its own position based on the knowledge of the positions of said radio frequency devices 5, contained in the beacon 10, and on the radio signals received by the wireless device 7 and emitted by the radio frequency devices 5, possibly also estimating the distance from each one of them based on radio signals through any known technique, e.g. by applying the triangulation system to the data thus obtained. In this way, the wireless device 7 can calculate its own position on the basis of the radio signals received from at least one radio frequency device 5 and of the geographic information 20 contained in the beacon 10 transmitted by the at least one access point 3.

In a preferred embodiment of the invention, the radio frequency device 5 not connected to the network is a passive RFID transponder which is electromagnetically energized only when the wireless device 7 is in its immediate vicinity.

Given the low cost of passive RFID transponders, the environment 2 covered by the wireless network 1 can be strewn with a very large number of transponders 5, so as to increase the level of accuracy in the localization of the wireless device 7.

The features of the present invention, as well as the advantages thereof, are apparent from the above description.

A first advantage of the present method for localizing the position of a wireless device in an environment comprising a wireless network having at least one access point is that the position of the wireless device is determined with increased accuracy compared to the prior art. In fact, the method according to the present invention makes use of electronic elements, e.g. passive RFID transponders, which are very cheap and can therefore be strewn in a large number within the environment covered by the wireless network. The larger the number of said elements, the more information the wireless device can use to determine its own position, for example through known triangulation methods, thereby improving the localization accuracy.

A second advantage of the method according to the present invention is that the network of geographic information points created by the radio frequency devices not connected to the wireless network can be very easily modified. For this purpose, in fact, it is sufficient to modify the information content of the beacon by including therein the new geographic information of the radio frequency devices not connected to the wireless network. No modifications are therefore needed to the local network (whether wireless or wired).

Another advantage of the method according to the present invention is that the data necessary for localizing the radio frequency identifiers (and hence, by triangulation, the wireless device) can be easily and rapidly broadcast with no previous knowledge by the wireless device.

A further advantage of the present invention is that the wireless device is not required to gain access to the wireless local network in order to identify and authenticate itself.

A further advantage of the present invention is that the broadcasting of the geographic information about the radio frequency devices not connected to the network reduces to a minimum the time required for determining the position of the wireless device and avoids the overhead of a one-to-one communication protocol; the wireless device simply listens to the broadcast transmission without having to reply to it, thus saving energy.

A further advantage of the present invention is that, in the event of an emergency, the data being broadcast can be obtained by the rescuers as soon as they are within reach of an access point of the wireless network.

Yet another advantage of the method according to the present invention is that the access points and the wireless network are kept compatible with the IEEE 802.11 standard, e.g. variants with "g" and "n" versions.

The method for localizing the position of a wireless device in an environment comprising a wireless network having at least one access point described herein by way of example may be subject to many possible variations without departing from the novelty spirit of the inventive idea; it is also clear that in the practical implementation of the invention the illustrated details may have different shapes or be replaced with other technically equivalent elements.

For example, in addition to the information already mentioned above, other additional or alternative information for localizing radio frequency devices not connected to the wireless network may be the following:
- apartment, floor, street, street number, city, state;
- building, sector, aisle, rack, shelf;
- hall, row, column, stand;
- sector, row, column, seat;
- period of validity/date of expiry;
- maximum power of the response signal, power variation expected as distance changes;
- tag/antenna orientation, shape and direction of the corresponding lobes;
- maximum/minimum reception distance;
- obstacle, insurmountable limit, danger (electrical, chemical, biological, etc.), way of escape, door, stairs.

For example, the geographic information may be compressed and/or encrypted and/or protected by an error correction code, e.g. MD5.

For example, although the method has been described herein with reference to technologies defined in the IEEE 802.11 standard, it may also be used with other standards, e.g. LTE or UMTS, the specifications of which are defined by the 3GPP group. In particular, these latter LTE or UMTS standards include fields (Information Elements) in the broadcast messages which could be used in the same manner as the VSI element of the IEEE 802.11 standard.

For example, the TS 36.331 specification of the 3GPP-LTE standard or the TS 25.331 specification of the 3GPP-UMTS standard specify, for the broadcast channel, information fields called "SystemInformationBlockType10" or "SystemInformationBlockType12" and intended for broadcast information, including generic byte strings, which can be used in case of emergency.

It can therefore be easily understood that the present invention is not limited to a method for localizing the position of a wireless device in an environment comprising a wireless network having at least one access point, but may be subject to many modifications, improvements or replacements of equivalent parts and elements without departing from the novelty spirit of the inventive idea, as clearly specified in the following claims.

The invention claimed is:

1. A method for localizing a position of a wireless device in an environment comprising a wireless network that includes at least one Wi-Fi access point, wherein at least one electronic radio frequency device is located in said environment, wherein said method comprises:
   entering, by said at least one Wi-Fi access point, in a beacon frame of an emitted wireless signal emitted by said at least one Wi-Fi access point, geographic information about a geographic position of said at least one electronic radio frequency device that is located in said environment and that is not connected to and has no dependency on the wireless network, wherein the at least one electronic radio frequency device is located in a predetermined location that is known to the at least one Wi-Fi access point;

transmitting, by said at least one Wi-Fi access point, the beacon frame, wherein the beacon frame is transmitted periodically and includes basic information necessary for a wireless device to connect itself to said at least one Wi-Fi access point;

receiving, by said wireless device, said beacon frame that includes the basic information necessary for connecting to said at least one Wi-Fi access point, determining, by said wireless device, its own position on a basis of a radio frequency signal received from said at least one electronic radio frequency device and said geographic information included in said beacon frame, wherein said wireless device is not required to gain access to the wireless network in order to identify and authenticate itself for receiving said geographic information, and wherein said beacon frame can include the geographic information of electronic radio frequency devices located outside the wireless network.

2. The method according to claim 1, wherein said radio frequency device is an RFID transponder.

3. The method according to claim 2, wherein said RFID transponder is of the passive type.

4. The method according to claim 1, wherein said geographic information is subdivided into at least two of said beacon frames.

5. The method according to claim 1, wherein said beacon frame comprises a data packet compliant with an IEEE 802.11 standard.

6. The method according to claim 5, wherein said geographic information is contained in at least one Vendor Specific Information (VSI) data field of said data packet.

7. The method according to claim 1, wherein said geographic information comprises one or more of the following elements: identifier of said radio frequency device latitude, longitude, altitude, building, floor, room.

8. The method according to claim 1, wherein said electronic radio frequency device comprises memory means storing said identifier of said radio frequency device.

9. A wireless device comprising means for implementing the method according to claim 1.

10. The method of claim 1, further comprising determining, by said wireless device, a position of the wireless device without using GPS signals.

11. A Wi-Fi access point of a wireless network operating in an environment that includes at least one electronic radio frequency device that is not connected to said wireless network, said Wi-Fi access point comprising:

a transmitter for transmitting a beacon frame containing basic information necessary for connecting to said Wi-Fi access point, and software executable by said Wi-Fi access point and configured to enter, into the beacon frame, geographic information about a geographic position of the at least one electronic radio frequency device, wherein the at least one electronic radio frequency device is not connected to said wireless network and has no dependency on said wireless network;

wherein the at least one electronic radio frequency device is located in a predetermined location that is known said Wi-Fi access point, and wherein said beacon frame is transmitted by said Wi-Fi access point periodically in order to allow connection to the wireless network, wherein a wireless device is not required to gain access to said wireless network in order to identify and authenticate itself for receiving said geographic information, and wherein said beacon frame can include the geographic information of electronic radio frequency devices located outside the wireless network.

12. A Wi-Fi access point of a wireless network located in an environment for allowing a wireless device to connect to said Wi-Fi access point, wherein the environment includes at least one electronic radio frequency device that is not connected to said wireless network, said Wi-Fi access point comprising:

a transmitter for transmitting a beacon frame including geographic information about a geographic position of the at least one electronic radio frequency device that is located in said environment, wherein the at least one electronic radio frequency device is not connected to said wireless network and has no dependency on said wireless network;

software executable by said Wi-Fi access point to enter said geographic information about said at least one electronic radio frequency device into the beacon frame, wherein the at least one electronic radio frequency device is located in a predetermined location that is known to said Wi-Fi access point, and wherein said beacon frame signal is transmitted by said Wi-Fi access point periodically in order to allow connection to the wireless network, wherein the geographic position entered into the beacon frame allows the wireless device to determine its position in the environment without using a GPS signal, wherein the wireless device is not required to gain access to said wireless network in order to identify and authenticate itself for receiving said geographic information, wherein said beacon frame can include the geographic information of electronic radio frequency devices located outside the wireless network.

13. A system for determining a position of a wireless device, the system comprising:

a wireless network having at least one Wi-Fi access point transmitting a beacon frame, wherein the beacon frame includes basic information necessary for connecting to said at least one Wi-Fi access point;

said at least one Wi-Fi access point comprising software configured to enter, into the beacon frame, geographic information about a geographic position of at least one electronic radio frequency device that is located in said environment and that is not connected to the wireless network and that has no dependency on said wireless network, and said wireless device comprising a receiver receiving said beacon frame;

said at least one electronic radio frequency device comprising memory means storing a univocal identifier, wherein the at least one electronic radio frequency device is located in a predetermined location that is known to the at least one Wi-Fi access point, wherein said beacon frame is transmitted by the at least one Wi-Fi access point periodically in order to allow connection to the wireless network, and wherein said wireless device can calculate its own position on a basis of a radio frequency signal received from said at least one radio frequency device and said geographic information included in said beacon frame, wherein the wireless device is not required to gain access to said wireless network in order to identify and authenticate itself for receiving said geographic information, wherein said beacon frame can include the geographic information of electronic radio frequency devices located outside the wireless network.

\* \* \* \* \*